United States Patent [19]

Dockins

[11] 3,944,257
[45] Mar. 16, 1976

[54] COMPENSATOR COUPLING FOR LOGGING TRUCK AND TRAILER

[76] Inventor: Lonnie L. Dockins, 1295 Magnolia Ave., Willits, Calif. 95490

[22] Filed: Jan. 9, 1975

[21] Appl. No.: 539,903

[52] U.S. Cl. .......... 280/404; 280/446 R; 280/478 R
[51] Int. Cl.² ............................................ B60P 3/40
[58] Field of Search .... 280/482, 404, 478 B, 478 R, 280/446 R; 214/84

[56] References Cited
UNITED STATES PATENTS

| | | | |
|---|---|---|---|
| 2,520,776 | 8/1950 | Page | 280/404 |
| 2,910,197 | 10/1959 | Beckner | 214/84 |
| 2,915,209 | 12/1959 | Layne | 214/506 |
| 3,083,986 | 4/1963 | Moody et al. | 280/482 X |
| 3,591,200 | 7/1971 | Van Raden | 280/404 X |
| 3,698,739 | 10/1972 | Szymanski et al. | 280/478 B |

Primary Examiner—M. H. Wood, Jr.
Assistant Examiner—John A. Pekar
Attorney, Agent, or Firm—Townsend and Townsend

[57] ABSTRACT

A compensator mechanism for coupling a logging truck and trailer together to allow for relative longitudinal movement between them during turning. A compensator tube is extensibly mounted within a sleeve affixed to the leading end of the trailer reach pole. The forward end of the tube is adapted to be coupled to the truck hitch. A spool shaped roller having a surface which conforms to the compensator tube is mounted on the reach pole in sliding contact with the upper portion of the tube. In operation, as the truck moves along a curved path the roller absorbs lateral thrust loads exerted on the compensator tube and reduces wear between the tube and sleeve.

4 Claims, 6 Drawing Figures

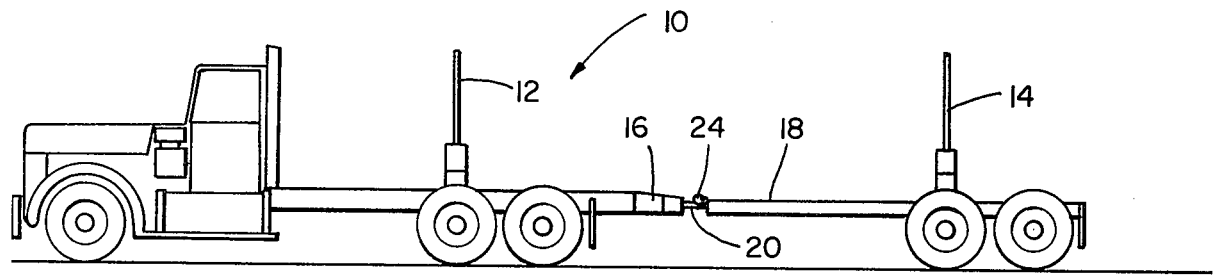
FIG_1
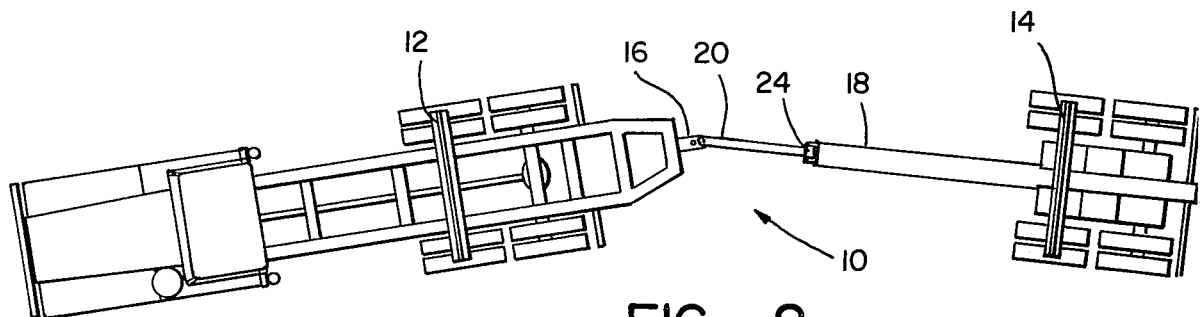
FIG_2
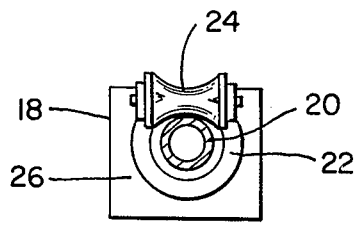
FIG_4
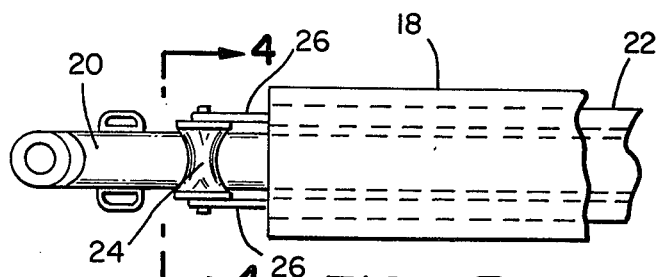
FIG_3
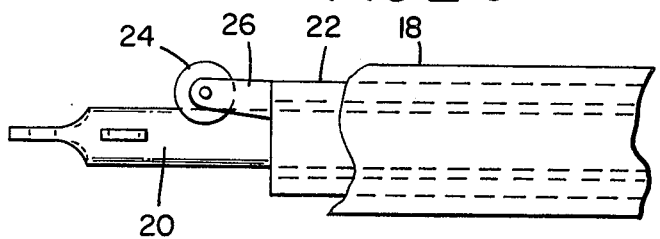
FIG_5
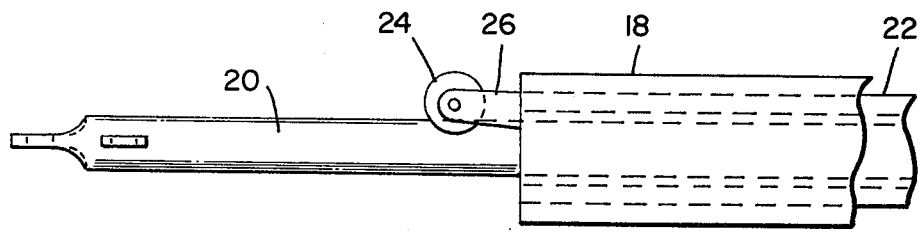
FIG_6

COMPENSATOR COUPLING FOR LOGGING TRUCK AND TRAILER

The present invention relates to motor vehicles of the truck and trailer type and is more particularly directed to an improved coupling means for connecting a logging truck and trailer to provide the relative longitudinal movement between them which is necessary in order to negotiate turns.

Logging truck and trailer combinations are typically provided with a compensator coupling mechanism for permitting longitudinal movement between truck and trailer during turning movements of the vehicle. This is necessary because when the vehicle is loaded, the logs maintain a constant straight line distance between the log supports on the truck and trailer. On the other hand, during a turn the distance between the support points as measured along the longitudinal center lines of the vehicles must increase.

One approach previously employed to provide the requisite degree of relative movement between truck and trailer involves a sliding compensator tube which connects the hitch or stinger of the truck to the forwardly extending reach pole of the trailer. The compensator tube is telescopically received within a sleeve attached to the front end of the reach pole. When the truck changes direction as during a turn or when rounding a curve the compensator tube is extended out of the sleeve to adjust for the increased distance between the truck and trailer as measured along the center lines of the two units.

The problem which has been encountered in apparatus of this type is that the sliding fit between the compensator pole and its sleeve must be relatively tight to absorb lateral thrust loads during turns, as well as vertical loads on rough road surfaces, without subjecting the coupling to undesirable impact forces. As a result, the tube and its housing are usually greased for lubrication, and the abrasive action of accumulated dust and dirt trapped in the grease between the sleeve and pole results in excessive wear on the components often leading to premature failure.

The present invention provides a structure which allows the clearance between compensator tube and sleeve to be increased without creating impact forces and adversely effecting vehicle control. This is accomplished through the use of a roller spool whose surface conforms to a portion of the cylindrical outer surface of the compensator tube. In this manner the roller absorbs lateral thrust caused when the truck makes turns and eliminates the problems alluded to above.

These and other objects, features and advantages will be more readily apparent after reading the following detailed description with reference to the accompanying drawings wherein:

FIG. 1 is an overall side elevation view of a logging truck and trailer;

FIG. 2 is a plan view of the truck and trailer of FIG. 1 in turning mode illustrating extension of the compensator tube;

FIG. 3 is an enlarged plan view of the compensator mechanism of the present invention including the extensible tube and conforming roller;

FIG. 4 is a transverse cross-sectional view of the roller and compensator tube tube taken along line 4—4 of FIG. 3;

FIG. 5 is a side elevation view of the compensation mechanism shown in FIG. 3; and FIG. 6 is a side elevation view of the mechanism of FIG. 5 in its extended configuration.

Referring now to the drawings wherein like numerals in the different views designate the same element, FIGS. 1 and 2 depict a truck and trailer generally designated at 10. The truck portion of the vehicle is equipped with log holding bunk 12 and the trailer portion with longitudinally aligned log holding bunk 14. These bunks receive the logs loaded on the vehicle and prevent their movement both laterally and longitudinally. Extending from the rear of the truck is a hitch or stinger 16 to which the trailer is connected. The leading end of the trailer is provided with a reach pole 18 having a compensator tube 20 extensibly mounted in a sleeve 22, fixed within the forward portion of the reach pole 18.

As best seen in FIG. 3–6, a roller 24 carried on spaced arms 26 is mounted on the front end of reach pole 18. Roller 24 has a machined spool shaped surface which mates with and conforms to the upper portion of the outer cylindrical surface of compensator tube 20. Roller 24 minimizes the wear on the inner surface of the sleeve in which tube 20 is received as it moves into the reach pole thus eliminating the heretofore necessary greasing of the contact surfaces of the pole and sleeve. The roller also absorbs lateral thrust when the truck makes turning movements, further reducing friction and impact wear on the coupling components.

I claim:

1. In a trailer for use with a towing vehicle: a reachpole having a forward end and a cylindrical sleeve at said forward end, the front extremity of the sleeve being open; and elongated, cylindrical member telescopically received within and movable longitudinally of the sleeve, the member having a front end exteriorly of the sleeve and provided with means on said front end for releasably attaching the same to a towing vehicle; a roller; and means rotatably mounting the roller on said forward end of the reach pole for rolling contact with the outer surface of said member, said roller having a spool-shaped, member-engaging surface which mates with and conforms to said outer surface of the member.

2. In a trailer as set forth in claim 1, wherein said mounting means includes a pair of arms secured to and extending forwardly from said forward end of the reach pole, said roller being between and rotatably mounted on said arms.

3. In a trailer of the type suitable for use with a towing vehicle and having a reach pole provided with a forward end, an open end cylindrical sleeve at said forward end, and an elongated, cylindrical member telescopically received within and movable longitudinally of the sleeve, the member having a front end exteriorly of the sleeve and provided means on said front end for releasably attaching the same to a towing vehicle, the improvement comprising: a roller; and means coupled to the roller for rotatably mounting the same in an operative positon on said forward end of the reach pole for rolling contact wih the outer surface of said member, said roller having a spool-shaped, member-engaging surface which mates with and conforms to said outer surface of the member when said roller is in said operative position.

4. In a trailer as set forth in claim 3, wherein said mounting means includes a pair of arms adapted to be secured to and to extend fowardly from said forward end of the reach pole, said roller being positionable between and rotatably mountable on said arms.

* * * * *